March 14, 1961 — A. KURTI — 2,974,480
BALANCED EXHAUST NOZZLE
Filed Dec. 4, 1957 — 2 Sheets-Sheet 1
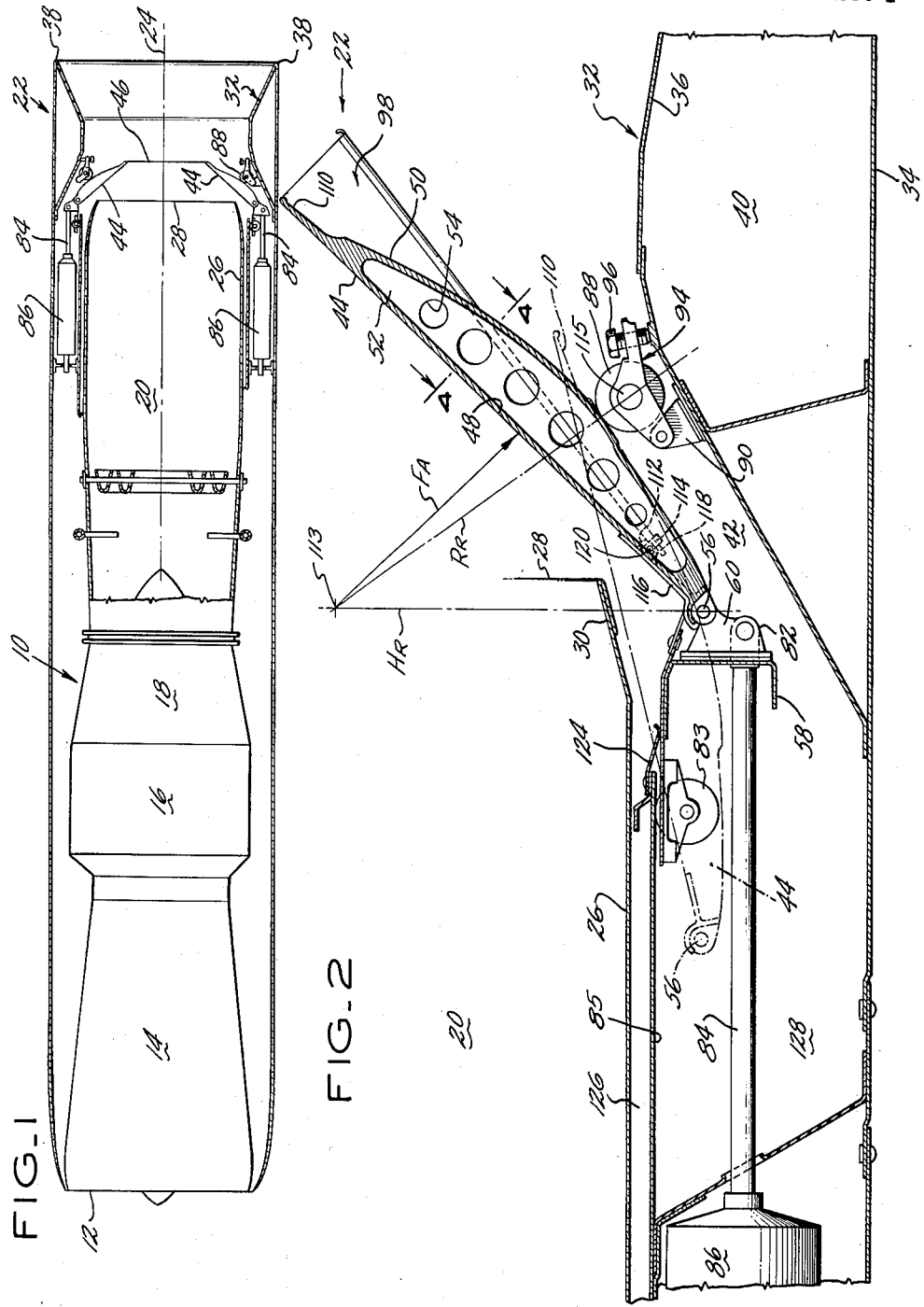
INVENTOR
ALEXANDER KURTI
BY Vernon F. Hauschild
ATTORNEY March 14, 1961 A. KURTI 2,974,480
BALANCED EXHAUST NOZZLE
Filed Dec. 4, 1957 2 Sheets-Sheet 2
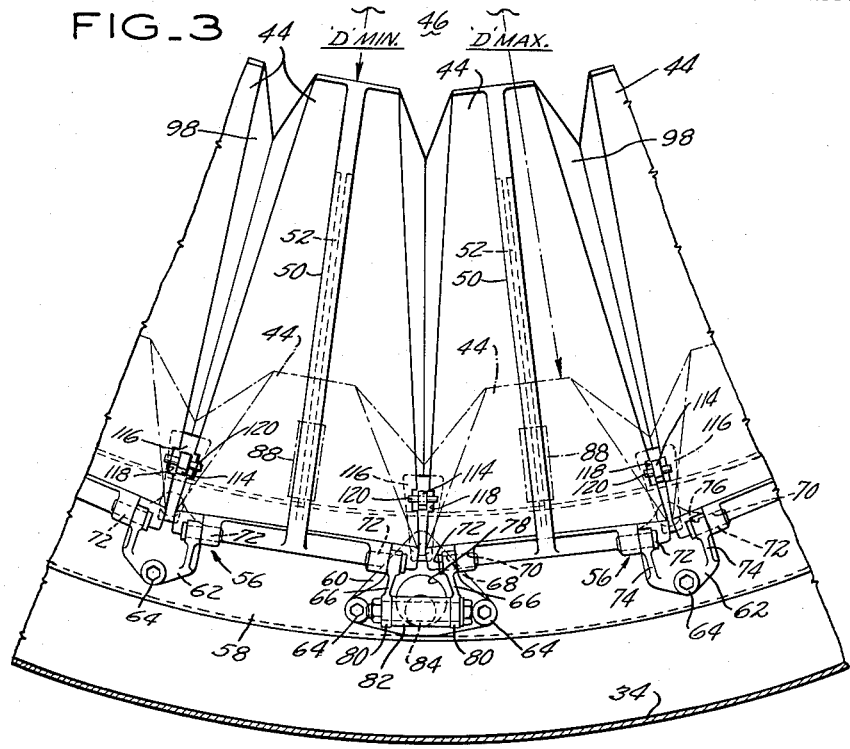
FIG.3
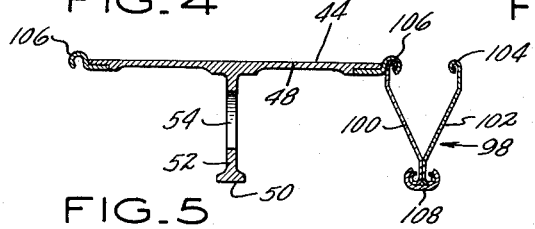
FIG.4
FIG.5
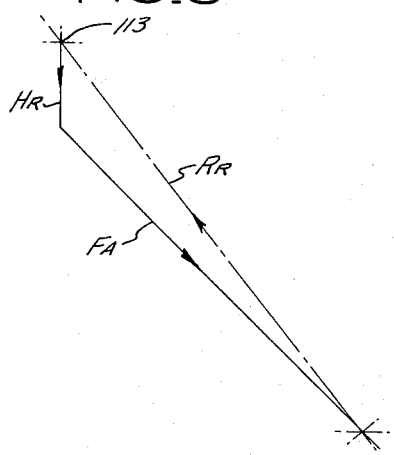
FIG.6
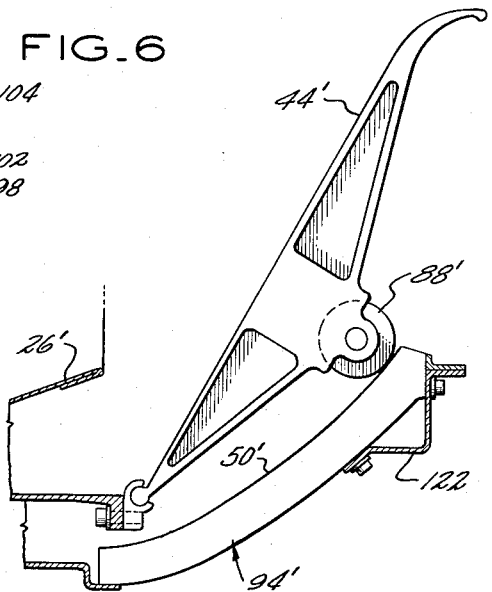
INVENTOR
ALEXANDER KURTI
BY Vernon F. Hauschild
ATTORNEY

United States Patent Office 2,974,480
Patented Mar. 14, 1961

2,974,480

BALANCED EXHAUST NOZZLE

Alexander Kurti, Wethersfield, Conn., assignor to United Aircraft Corporation, East Hartford, Conn., a corporation of Delaware Filed Dec. 4, 1957, Ser. No. 700,723

4 Claims. (Cl. 60—35.6)

This invention relates to exhaust nozzles and more particularly to variable area exhaust nozzles of the type used in modern aircraft engines.

It is an object of this invention to teach an exhaust nozzle in which the aerodynamic gas loads imposed upon the flaps are balanced or in equilibrium with the support reactions.

It is a most important object of this invention to teach an exhaust nozzle having both pivotal and translatable flaps and having a roller-cam unit to radially position the flaps, and a cam surface contoured with respect to flap hinge location and the cam-roller location such that the aerodynamic gas load imposed upon the flap is balanced by the cooperation of the reaction loads imposed upon the cam-roller unit and the pivot hinge. The net resultant force on the flaps caused by the aerodynamic load and the cam-roller and hinge reaction loads is controlled to be either perpendicular to the exhaust nozzle axis, to be radial with respect to the flap pivot hinge, so that all axial flap forces are balanced for all flap positions or so that a net resultant axial force is imposed upon the flaps for all flap positions.

It is a further object of this invention to teach a method of fabricating an exhaust nozzle having hinged ad pivotal flaps which are supported radially by a cam-roller unit comprising fabricating the cam surface, for all flap positions, to be perpendicular to the line passing through the roller center and the common intersection point of the flap aerodynamic gas load vector and the flap pivot hinge resultant force vector.

It is a further object of this invention to utilize a cam-roller unit to radially position the pivotal flaps of an exhaust nozzle and to support this unit within a circular member so that the reaction force set up in the roller-cam unit by flap aerodynamic gas loading is absorbed by the circular member in hoop tension.

It is a further object of this invention to utilize a cam-roller unit to radially position the pivotal flaps of an exhaust nozzle so that either a cam web or a roller support extends along the flap center line for stiffening purposes so that in view of this stiffening effect and the hoop tension load reception described supra, the exhaust nozzle may be made light in weight due to lessened load requirements.

It is a further object of this invention to teach an exhaust nozzle having pivotal flaps in which the flap aerodynamic gas loads are not imposed as a centilever load on the flaps.

It is still a further object of this invention to teach a variable area exhaust nozzle of desirable construction from a kinematic standpoint.

Other objects and advantages will be apparent from the specification and claims, and from the accompanying drawings which illustrate embodiments of the invention.

Fig. 1 is an external view of a modern turbojet aircraft which is broken away at the afterburner section to show my exhaust nozzle in its environment.

Fig. 2 is an enlarged cross sectional showing of my exhaust nozzle, with the flaps shown in their closed position in solid lines and in their open positions in phantom.

Fig. 3 is a rear view showing of my exhaust nozzle to illustrate the flaps in their closed position in solid and in their open position in phantom.

Fig. 4 is a fragmentary showing taken along line 4—4 of Fig. 2.

Fig. 5 is a vector triangle illustrating the flap aerodynamic gas load and the cooperating reaction roller-cam and hinge pivot loads balancing same.

Fig. 6 is an alternate construction of my exhaust nozzle showing the roller to be carried by the flap while the cam is positioned separately in stationary fashion.

Referring to Fig. 1, we see modern turbojet aircraft 10 which comprises air inlet section 12, compressor section 14, combustion section 16, turbine section 18, afterburner section 20, and my exhaust nozzle unit 22.

Air enters engine 10 through inlet section 12 and is compressed as it passes through compressor section 14 and is heated as it passes through combustion section 16. The heated engine gases then pass through turbine section 18 and may then be discharged to the atmosphere through my exhaust nozzle unit 22 or may pass through afterburner section 20 from whence it is discharged to the atmosphere through my exhaust nozzle 22, which is concentric about engine axis 24.

This brief description is considered sufficient to illustrate my exhaust nozzle invention in its environment and reference may be had to United States Patent Nos. 2,700,946 and 2,711,631 and 2,715,311 for a more particular and detailed description of an aircraft engine 10 and afterburner 20.

Fig. 2 shows an enlarged cross sectional showing of one-half of my exhaust nozzle and it should be borne in mind that a similar showing would be seen on the opposite side of axis 24. In Fig. 2, we see afterburner duct 26 through which the engine exhaust gases pass and which is of circular cross section and concentric about axis 24 and terminates in a circular outlet 28 at its downstream end 30. Stationary divergent nozzle section 32 is spaced axially downstream from afterburner duct 26 and comprises outer wall 34 and inner wall 36, which converges toward outer wall 34 and smoothly joins thereto at 38 to define enclosed cavity 40. The axial spacing between afterburner duct 26 and stationary divergent section 32 defines space 42 therebetween in which a plurality of circumferentially equally spaced flaps 44 are located to define the diameter and therefore the area of the substantially circular exhaust outlet 46 which is formed by exhaust nozzle 22. Flaps 44 are preferably flat along their inner surface 48 and are reinforced by cam web 52, which has lightening holes 54 therein, and supports contoured cam surface 50. Flaps 44 are pivoted at one of their ends by flap-to-ring pivot hinge 56 to ring unit 58 which is circular and concentric about afterburner duct 26 and axis 24 and translatable fore and aft with respect thereto. Ring 58 carries fixtures such as 60 and 62 thereon through any convenient connection means such as bolts 64, as best shown in Fig. 3. Fixture 60 has two journal carrying members 66 carrying journal holes 68 which align with cooperating journal holes 70 of flap 44 to receive pivot pin 72 and, in combination with comparable equipment on the opposite flap side, forms flap to ring pivot hinge 56. Fixture 62 also carries journal forming members 74 which carry journal holes 76 to align with a cooperating flap hole 70 to receive hinge pin 72. The only material difference between fixture 60 and 62 is that the former contains hole 78 and carries spaced journals 80 to receive the T-head 82 of ring actuating rod 84 to prevent ring 58 skewing thereby causing the ring 58 to be positioned radially perpendicular to axis 24 at all times. Actuating rod 84 is attached to any actuating means such as hydraulic or compressor air actuated cylinder and piston unit 86 which causes rod 84 and hence ring unit 58 to translate fore and aft along axis 24 to cause the plurality of flaps 44 to pivot about hinge pivot 56 and thereby translate axially and pivot radially with respect to axis 24 from its Figs. 2 and 3 solid position to its Figs. 2 and 3 phantom position.

As shown in Figs. 2 and 3, when in their closed, or minimum exhaust outlet area, or radially inward or solid line position, the plurality of flaps 44 coact with afterburner duct 26 to form a convergent exhaust nozzle defining a minimum area substantially circular throat of diameter $D_{min}$, as shown in Fig. 3. When flaps 44 are in in their open, or maximum exhaust outlet area, or radially outwardly position or their phantom position as shown in Figs. 2 and 3, they then coact with afterburner duct 26 and stationary divergent section 32 to form a convergent-divergent exhaust nozzle presenting maximum area substantially circular throat of diameter $D_{max}$, as shown in Fig. 3.

While the fore and aft axial translation of ring 58 causes the plurality of flaps 44 to translate and pivot about pivot point 56, the flaps 44 are radially positioned by the coaction between cam 50 and a plurality of stationary rollers 88 which are rotatably mounted by mounting means 90 and circumferentially equally spaced about stationary section 32 which is of circular cross section about axis 24 so that as the engine exhaust gases impinge against and thereby provide an aerodynamic load against the inner surface 48 of flap 44, this aerodynamic flap load is resisted jointly by a reaction force or load imposed on hinge 56 at ring 58 and on the cam-roller unit 94 which is formed by rollers 88 and cam 50. The cam-roller reaction force is taken by circular member 32 in hoop tension and axial tension. Cam-roller units 94 coact with translating ring 58 which carries pivot hinge 56 to radially position and support flaps 44 as ring 58 translates, thereby in combination, positioning flaps 44 to define a desired exhaust nozzle configuration. Set screw 96 is provided to afford a measure of flexibility to the position of rollers 88 and hence to provide a control over the exhaust nozzle defined areas, such as $D_{min}$ and $D_{max}$.

Any convenient inter flap sealing means may be used to seal between flaps 44 to prevent the engine exhaust gas passing therebetween but it is preferable that the friction involved in this sealing means be held to a minimum and therefore the pivot seal configuration 98, as shown in Figs. 2, 3, and 4, is preferable to an overlapping flap arrangement. Sealing unit 98 comprises three pieces; namely, triangular sheet metal pieces 100 and 102, each of which pivotally attaches at a rolled end such as 104 to a receiving channel 106 which extends along the full flap side dimension of flaps 44 to pivotally receive seal piece rolled ends 104. The anti-flap ends of members 100 and 102 are joined together in pivot fashion by scroll member 108 so that as the plurality of exhaust nozzle flaps 44 pivot about hinges 56, and radially inwardly and outwardly with respect to axis 24, the sealing means 98 expands and contracts in accordion fashion to fill the gap between adjacent flaps 44. Seal 98, as shown in Fig. 2, tapers from its greatest dimension at blade outer end 110 toward blade surface 48 and finally culminates at 112 at which point the end of scroll unit 108 is received in auxiliary seal lug 114, thereby positioning the end of seal unit 98. Lug 114 is attached in any convenient manner to seal plate 116 and passes through aperture 118 in flap 44 and carries pin 120 which is of larger size than aperture 118 to prevent seal plate 116 from lifting off from flap 44.

The combined action of seal unit 98 and seal plate 116 serves to prevent engine exhaust gas interflap leakage.

As mentioned supra, it is an important teaching of this invention to provide an exhaust nozzle configuration in which the resultant exhaust aerodynamic gas flap load is controlled and, if desired, balanced so that the flap actuating means need only overcome friction resistance to cause exhaust nozzle actuation. The manner of accomplishing this resultant force load control or balance will be described in connection with the showing of Figs. 2 and 5.

For purposes of illustration the method of determining cam contour will be described for one flap position only but it should be borne in mind that the same method is carried out for all flap positions. Considering the Fig. 2 solid line flap position, the aerodynamic gas load which will be imposed upon flap 44 by the impinging of engine exhaust gases thereagainst is calculated and represented vectorially by load or force vector $F_A$. We know that the aerodynamic flap load $F_A$ will be supported or resisted by reaction loads imposed thereby upon flap roller unit 94, and flap pivot hinge 56. If we wish to have our flaps in aerodynamic balance so that no axial load will be imposed upon hinge 56 by flap 44, then our hinge reaction load must be radially directed as shown in Fig. 2 along vector line $H_R$ to intercept flap aerodynamic load vector $F_A$ at common point 113. If we were to balance the flap 44 loads in this flap position, the aforementioned flap aerodynamic gas load, the hinge reaction load and the roller reaction load vectors must intercept at a common point and also form a closed vector triangle. We therefore scribe cam-roller unit reaction load vector line $R_r$, as shown in Fig. 2, between common interception point 113 and the center 115 of roller 88. This will provide a closed vector diagram as shown in Fig. 5 and we will contour cam surface 50 to be perpendicular to vector line $R_r$ at its point of roller contact for the Fig. 2 solid line flap 44 position. A similar computation is gone through to determine the cam contour for all other flap positions and in this fashion, cam 50 is contoured so as to provide a net resultant flap force on hinge 56 which is radial or perpendicular to axis 24, and with balanced axial forces.

It will be apparent to those skilled in the art that, if for any reason, we wish to provide a net resultant flap axial force on hinge 56, such may be done by following the precise teachings of this invention. For example, it may be desired to have exhaust nozzle 22 in its open or maximum area $D_{max}$ position when afterburner 20 ignites and such might not occur if actuating means 86 were inoperative so that, following the precise teachings of this invention, it might be considered desirable to provide a net resultant axial flap force on hinge 56 which would cause exhaust nozzle actuation to its open or maximum area $D_{max}$ position in response to the increased pressure caused by afterburner ignition.

As shown in Fig. 6 roller 88' could be carried by flap 44' and cam surface 50' of unit 94' could be made stationary and supported in hoop tension by ring 122 which in turn may be supported in any convenient fashion.

As mentioned previously, it is an important teaching of this invention to provide a balanced exhaust nozzle in the fashion already taught so that the net resultant flap force on hinge 56 will be radial and under such a condition, actuating means 86 need overcome friction forces only to actuating exhaust nozzle 22. To reduce these friction forces exhaust nozzle 22 utilizes the low friction rolling contact of cam-roller unit 94, uses hinge type seals 98, and may use a roller contact between ring seal 124 and actuating ring 58.

Seal 124 performs the function of sealing between flow controlled cooling air passage 126 from which cooling air is passed across the inner surface 48 of flaps 44 and cooling air passage 128, which may receive its cooling air from ram air directly and from which cooling air is passed ejector fashion between stationary divergent section 32 and the cam side of flap 44.

While my invention is shown in connection with a convergent-divergent nozzle in Fig. 2, it should be borne in mind that it is equally useable with a convergent exhaust nozzle, for instance, as shown in Fig. 6, whether the roller 88' is carried by the flap 44' or is positioned on stationary ring 122.

It is to be understood that the invention is not limited to the specific embodiments herein illustrated and described but may be used in other ways without departure from its spirit as defined by the following claims.

I claim:

1. A variable area exhaust nozzle defining an exhaust outlet which is substantially circular about an axis and comprising a plurality of flaps equally spaced circumferentially about said axis and pivotally hinged to a flap actuator which is translatable along said axis to cause simultaneous translation of said flaps along said axis, a plurality of stationary rollers positioned circumferentially about said axis, said flaps having cam surfaces contacting said rollers so that said flaps are caused to pivot inwardly and outwardly with respect to said axis to vary the area of said exhaust outlet due to the combined action of the translation of said flap actuator and the cam-roller coaction, said cam being so contoured that the flap aerodynamic gas loads vector and the cam and roller reaction vectors intersect at a common point and form a closed force vector triangle with a flap hinge vector which is radial solely.

2. A variable area exhaust nozzle defining an exhaust outlet which is substantially circular about an axis and comprising a plurality of flaps equally spaced circumferentially about said axis and pivotally hinged to a flap actuator which is translatable along said axis to cause simultaneous translation of said flaps along said axis, a plurality of stationary cams positioned circumferentially about said axis, said flaps having rollers attached thereto and contacting said cams so that said flaps are caused to pivot inwardly and outwardly with respect to said axis to vary the area of said exhaust outlet due to the combined action of the translation of said flap actuator and the cam-roller coaction, said cam being so contoured that the flap aerodynamic gas loads vector and the cam and roller reaction vectors intersect at a common point and form a closed force vector triangle with a flap hinge vector which is radial solely.

3. A variable area exhaust nozzle positioned about the periphery of the end of a duct of circular cross-section about an axis and comprising a stationary, continuous, convergent-divergent section spaced axially and radially from said duct end to define a space therebetween, a plurality of rollers fixed circumferentially about said stationary, continuous, convergent-divergent section, a ring concentric about said duct and translatable along said axis, a plurality of flaps located in said space so that a cooling air passage is formed between said duct and said flaps and between said convergent-divergent section and said flaps in all flap positions and so that said flaps define an exhaust outlet which is substantially circular about said axis and which flaps are equally spaced circumferentially about said axis and pivotally hinged at one end to said ring, means to cause said ring to translate to cause simultaneous translation of said flaps along said axis, means to seal between said flaps with minimum friction, each of said flaps having a cam surface contacting one of said rollers so that said flaps are caused to pivot inwardly with respect to said axis to form a convergent exhaust nozzle and outwardly with respect to said axis to coact with and form a convergent-divergent exhaust nozzle with said duct and said convergent-divergent section which flap pivoting is due to the combined action of the translation of said ring and the cam-roller coaction, means to pass gas through said exhaust nozzle and thereby impose an aerodynamic gas load on said flaps which flap load is resisted by said cam-roller and the flap-to-ring pivot hinge reaction loads, said cam being so contoured that the flap aerodynamic gas load vector and the hinge and cam-roller reaction vectors intersect at a common point and form a closed force vector triangle having a hinge vector which is solely radial.

4. A variable area exhaust nozzle positioned about the periphery of the end of a duct of circular cross-section about an axis and comprising a stationary, continuous, convergent-divergent section spaced axially and radially from said duct end to define a space therebetween, a plurality of cam surfaces fixed circumferentially about said stationary, continuous, convergent-divergent section, a ring concentric about said duct and translatable along said axis, a plurality of flaps located in said space so that a cooling air passage is formed between said duct and said flaps and between said convergent-divergent section and said flaps in all flap positions and so that said flaps define an exhaust outlet which is substantially circular about said axis and which flaps are equally spaced circumferentially about said axis and pivotally hinged at one end to said ring, means to cause said ring to translate to cause simultaneous translation of said flaps along said axis, means to seal between said flaps with minimum friction, each of said flaps having a roller contacting one of said cam surfaces so that said flaps are caused to pivot inwardly with respect to said axis to form a convergent exhaust nozzle and outwardly with respect to said axis to coact with and form a convergent-divergent exhaust nozzle with said duct and said convergent-divergent section which flap pivoting is due to the combined action of the translation of said ring and the cam-roller coaction, means to pass gas through said exhaust nozzle and thereby impose an aerodynamic gas load on said flaps which flap load is resisted by said cam-roller and the flap-to-ring pivot hinge reaction loads, said cam being so contoured that the flap aerodynamic gas load vector and the flap-to-ring pivot and cam-roller reaction force vectors intersect at a common point and form a closed force vector triangle having a flap-to-ring vector which is solely radial.

References Cited in the file of this patent
UNITED STATES PATENTS

| | | |
|---|---|---|
| 2,699,645 | Oulianoff | Jan. 18, 1955 |
| 2,770,944 | Jordan | Nov. 20, 1956 |
| 2,778,190 | Bush | Jan. 22, 1957 |
| 2,831,321 | Laucher | Apr. 22, 1958 |

UNITED STATES PATENT OFFICE
CERTIFICATION OF CORRECTION

Patent No. 2,974,480                      March 14, 1961

Alexander Kurti

It is hereby certified that error appears in the above numbered patent requiring correction and that the said Letters Patent should read as corrected below.

Column 6, line 52, after "flap-to-ring" insert -- pivot --.

Signed and sealed this 25th day of July 1961.

(SEAL)
Attest:

ERNEST W. SWIDER
Attesting Officer

DAVID L. LADD
Commissioner of Patents